United States Patent [19]
Gould et al.

[11] Patent Number: 5,410,300
[45] Date of Patent: Apr. 25, 1995

[54] DISTRIBUTED CROSSBAR SWITCH ARCHITECTURE

[75] Inventors: Joel M. Gould, Winchester; Neal M. Lackritz, Burlington, both of Mass.

[73] Assignee: International Business Machines Corporation, Armonk, N.Y.

[21] Appl. No.: 109,400

[22] PCT Filed: Nov. 6, 1991

[86] PCT No.: PCT/GB91/01947

§ 371 Date: Jul. 6, 1993

§ 102(e) Date: Jul. 6, 1993

[87] PCT Pub. No.: WO92/08921

PCT Pub. Date: May 29, 1992

Related U.S. Application Data

[63] Continuation of Ser. No. 756,047, Sep. 6, 1991, abandoned.

[51] Int. Cl.$^6$ ............................................. H04Q 11/04
[52] U.S. Cl. .......................... 340/825.79; 340/825.03; 340/825.5; 340/825.52
[58] Field of Search ........... 340/825.03, 825.5, 825.52, 340/825.79, 825.8; 370/58.1, 60, 63, 85.6, 85.12; 379/272; 371/8.2

[56] References Cited

U.S. PATENT DOCUMENTS

| | | | |
|---|---|---|---|
| 4,016,539 | 4/1977 | Nanya | 340/825.5 |
| 4,075,693 | 2/1978 | Fox et al. | 364/200 |
| 4,314,233 | 2/1982 | Clark | 340/825.03 |
| 4,599,721 | 7/1986 | Murray | 370/112 |
| 4,633,386 | 12/1986 | Terepin | 364/200 |
| 4,638,475 | 1/1987 | Koike | 340/825.52 |
| 4,696,000 | 9/1987 | Payne, III | 370/60 |
| 4,710,769 | 12/1987 | Friedman et al. | 340/825.03 |
| 4,714,922 | 12/1987 | Cripps et al. | 340/825.03 |
| 4,807,184 | 2/1989 | Shelor | 340/826 |
| 4,845,722 | 7/1989 | Kent et al. | 370/58 |
| 4,849,751 | 7/1989 | Barber et al. | 340/825 |
| 4,852,083 | 7/1989 | Niehaus et al. | 370/58 |
| 4,901,305 | 2/1990 | Tangonan | 370/1 |
| 4,929,939 | 5/1990 | Varma et al. | 340/825.8 |
| 4,929,940 | 5/1990 | Franaszek et al. | 340/825.02 |
| 4,968,977 | 11/1990 | Chinnaswamy et al. | 340/825.8 |
| 4,973,956 | 11/1990 | Lin et al. | 340/825.86 |
| 4,975,901 | 12/1990 | Poli | 370/58.1 |
| 4,982,187 | 1/1991 | Goldstein et al. | 340/825.79 |
| 4,991,171 | 2/1991 | Teraslinna et al. | 340/825.52 |

FOREIGN PATENT DOCUMENTS

| | | |
|---|---|---|
| 0315550A2 | 11/1988 | European Pat. Off. . |
| 0356110A2 | 8/1989 | European Pat. Off. . |
| 0276076 | 7/1988 | United Kingdom . |
| 8909521 | 10/1989 | WIPO . |

OTHER PUBLICATIONS

G. S. Miranker, "Simple Parallel Adapter For A Logic Simulation Machine", Aug. 1982, vol. 25, No. 3A, IBM Corp., 1982, pp. 1274–1275.

R. W. Chang and B. C. Troutman, "Data/Test-Controlled Memory Architecture For Supercomputers", vol. 28, No. 3, Aug. 1985, IBM Corp., pp. 1293–1295.

*Primary Examiner*—Jeffery A. Hofsass
*Assistant Examiner*—Andrew Hill
*Attorney, Agent, or Firm*—Perman & Green

[57] ABSTRACT

A switching array as described for connecting ones of a plurality of data sources to ones of a plurality of data sinks. The array includes source data busses which transmit from a connected source, data words, a connection mask and a connection designator. The connection mask has bit positions that map to individual data sinks. A multiplexer/control circuit module is associated with each individual data sink for controlling the interconnection of the data sink to a source data bus. Each multiplexer/control circuit module is connected to each source data bus and is responsive to an active state connection mask bit and a connection designator on a first source data bus, to establish a connection between an associated sink and the first source data bus. This configuration enables the multiplexer/control circuit module to establish a connection without reference to any other multiplexer/control circuit.

13 Claims, 8 Drawing Sheets

DISTRIBUTED CROSSBAR SWITCH ARCHITECTURE

This is a continuation of application Ser. No. 07/756,047, filed on Sep. 6, 1991, abandoned.

FIELD OF THE INVENTION

This invention relates to crossbar and crosspoint switches, and more particularly to an architecture for such switches that exhibits distributed and independent control of data routing elements.

BACKGROUND OF THE INVENTION

Figure 1:
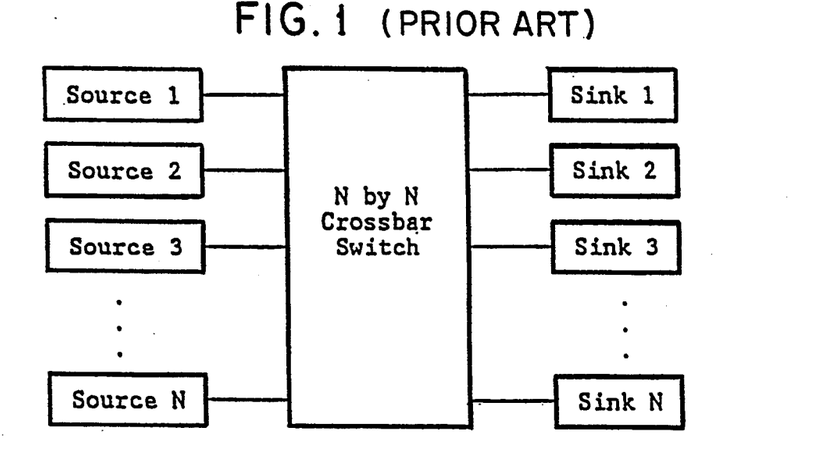
FIG. 1 is a block diagram of a crossbar switch that connects a plurality of data sources to a plurality of data sinks.

Crossbar switches are used in digital systems to provide communication between sources of data and sinks of data. A typical crossbar environment is shown in FIG. 1, wherein N sources of information and N sinks of information are shown connected by an N by N crossbar switch. At any given time, a data source may establish a connection to a data sink for data transmission. Connections may be terminated by either the source or the sink, and the crossbar switch allows several concurrent connections to operate. A crossbar switch should have the ability to establish a connection between one source and multiple sinks.

Crossbar switches see uses in many computer applications. In some parallel computers which share memories, the processors are placed on one side of a crossbar switch (acting as sources) and memory banks are placed on the other side (acting as sinks). As such, the switch allows any processor to access any memory bank and further allows multiple processors/memory bank connections to be in operation simultaneously. In such systems, one processor often wishes simultaneous access to data in several memory banks and as a result, the crossbar switch must support the notion of one source connecting to multiple sinks.

Crossbar switches are also found in nodes of distributed memory, parallel computer systems. In such systems, each node is directly connected to several other nodes, using data links. A crossbar switch at each node allows a message arriving along an inbound data link to be sent out over any set of outbound data links. In such systems, the initiating node merely wishes to know whether a message has been received at a receiving node and is unconcerned with how many copies of the message did not get through, so long as one does get through.

Attributes of an N by N crossbar switch are as follows:

1. Connection allocation and deallocation requests must be able to arrive from sources and sinks in an uncorrelated manner. Sources must be able to generate connection allocation requests and once a connection is established, either the source or the sink should be free to terminate the connection. Multiple connections should be handled concurrently. Sources and sinks should not be required to wait several clock cycles for a connection request to be completed.
2. The architecture must scale to encompass any size crossbar switch. Although physical constraints will limit the ultimate scalability of any design, the architecture itself should not impose any physical limits.
3. The crossbar switch architecture must be able to perform in a pipeline manner.
4. The crossbar switch architecture should not require an alternate connection control path, but rather should employ the primary data path for both data and control signal transmission. In other words, connection allocation should be performed by signals transmitted over the primary data path.
5. The crossbar switch architecture should support both one to one communication between a source and sink and one to many communication between a source and a set of sinks.

The prior art has attempted to achieve the above objectives through a number of design architectures. Several commercial digital crossbar switches provide data routing functions that are controlled by a configuration map. Examples of such switches are the Texas Instruments 74ACT8841 and 74AS8840. The configuration maps in those switches store connection information that details which sources are connected to which sinks. When a connection allocation or deallocation request is processed, the configuration map must be reloaded. This task is handled by a centralized controller that is implemented by the designer. Map reload takes several clock cycles in most implementations and, as a result, slows the data communication function.

In general, a centralized controller and data routing chip is expensive to implement and does not lend itself well to a dynamic switching environment where allocation and deallocation requests are received in an uncorrelated manner. While multiple crossbar switches can be cascaded to build larger switches, centralized controllers are not easily scalable.

In U.S. Pat. No. 4,852,083 to Niehaus et al., entitled "Digital Crossbar Switch" a crossbar switch is disclosed wherein the state of the switch is stored in a distributed fashion throughout the switch. This switch employs a configuration map which is reloaded, one multiplexer at a time, in order to change any single multiplexer's operation within the crossbar. A plurality of multiplexer logic units both store the relevant portions of the configuration map and enable interconnections to occur. A centralized controller is employed to reconfigure the switch.

U.S. Pat. No. 4,973,956 to Lin et al., entitled "Crossbar Switch With Distributed Memory" illustrates the use of a crosspoint network in a crossbar switch environment. The state of each crosspoint is stored at the crosspoint and is altered by either serially reloading each crosspoint with a new state or by serially reloading succeeding columns of the crosspoint switch under control of column addresses. The technique used to load a new map involves the use of an input data line, and further requires that data transfers be interrupted to enable entry of the new states, after which, data transfers can continue.

U.S. Pat. No. 4,599,721 to Murray, entitled "Programmable Cross Bar Multiplexer" describes a crossbar multiplexer, used as a data routing element, which allows one source to connect to many sinks or multisources to one sink. The multiplexer connection is configured by distributed state indications, however, little is said as to how the state indications are loaded, altered or reloaded.

U.S. Pat. No. 4,929,940 to Franaszek et al., entitled "Collision Crossbar Switch" describes a crossbar network wherein contention detection is employed at the destination. In the event of a collision of messages, rerouting to an alternate path is provided by a second interconnection network which has itself, contention resolution capability. The controller which establishes the initial interconnections in the multiplexer network is not considered in this patent.

A number of patents show the use of centralized controllers for control of crossbar switch states. See U.S. Pat. Nos. 4,975,901 to Poli; 4,929,939 to Varma et al; and European Patent Application 0 315 550 to Petzinger et al. Many other patents describe the use of crossbar switches with various systems but do not specifically describe how the crossbar is itself configured. Such disclosures can be found in European Patent Application 0 356 110 to Peters; 4,633,386 to Terapin; 4,968,977 to Chinnaswamy et al; 4,845,722 to Kent et al., 4,075,693 to Fox et al.,; 4,901,305 to Tangonan; 4,849,751 to Barber et al.; and in the following IBM Technical Disclosure Bulletin Articles: "Sample Parallel Adapter For A Logic Simulation Machine" Miranker, Vol. 25, No. 3A August 1982, pages 1274-1275, and "Data/Test-Controlled Memory Architecture for Supercomputers", Chang et al., Volume 28, No. 3, August 1985 pages 1293-1295.

Accordingly, it is an object of this invention to provide an improved crossbar switch that is adapted to handle allocation and deallocation requests that arrive in an uncorrelated manner.

It is another object of this invention to provide an improved crossbar switch whose state and control are distributed throughout the crossbar switch.

It is still another object of this invention to provide an improved crossbar switch architecture wherein control and data signals are transmitted over common paths.

It is yet another object of this invention to provide an improved crossbar switch architecture which has the ability to support one-to-one communication between a source and a sink, and one to many communication between a source and set of sinks.

SUMMARY OF THE INVENTION

A switching array as described for connecting ones of a plurality of data sources to ones of a plurality of data sinks. The array includes source data busses which transmit from a connected source, data words, a Connection mask and a connection designator. The connection mask has bit positions that map to individual data sinks. A multiplexer/control circuit module is associated with each individual data sink for controlling the interconnection of the data sink to a source data bus. Each multiplexer/control circuit module is connected to each source data bus and is responsive to an active state connection mask bit and a connection designator on a first source data bus, to establish a connection between an associated sink and the first source data bus. This configuration enables the multiplexer/control circuit module to establish a connection without reference to any other multiplexer/control circuit.

DETAILED DESCRIPTION OF THE INVENTION

ARCHITECTURE

Figure 2:
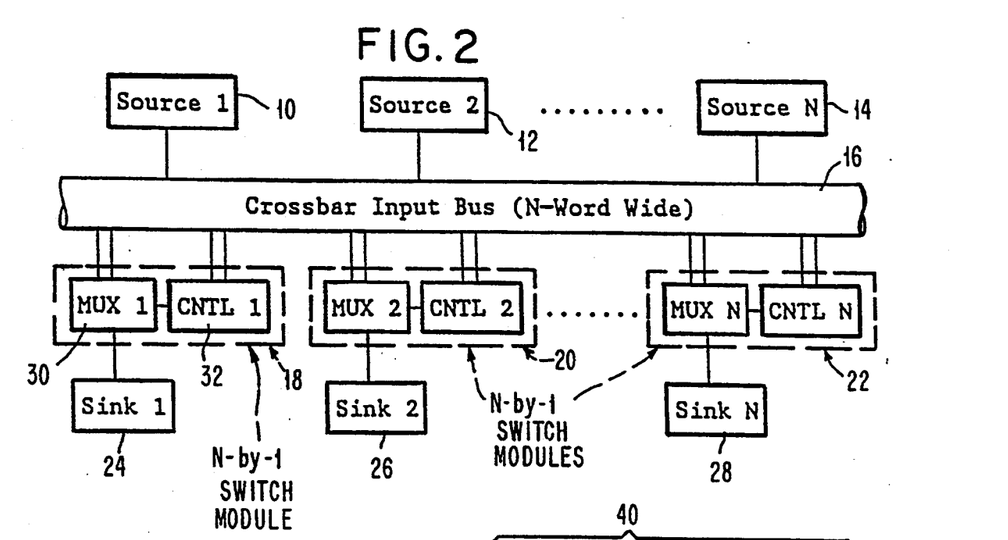
FIG. 2 is a block diagram of a crossbar switch architecture which embodies the invention.

The block diagram in FIG. 2 illustrates a distributed crossbar switch architecture that implements an embodiment of the invention. A plurality of data sources 10, 12, 14, etc. (hereafter "sources") are connected to a crossbar bus 16. The width of crossbar bus 16 is equal to the number of sources connected to the bus multiplied by the number of bits per source data word. Thus, crossbar bus 16 is essentially a grouping of subbusses, one each subbus connected to a source and adapted to carry, broadside, one word at a time from the connected source. A plurality of N-by-1 switch modules 18, 20, 22 connect a plurality of data sinks 24, 26, 28, etc., (hereafter "sinks") to crossbar bus 16. Each N-by-1 switch module contains a portion of the crossbar control circuitry. As can be seen from FIG. 2, one N-by-1 switch module is associated with each sink in the system. The crossbar switch is composed entirely by the N-by-1 switch modules and no other control circuitry is required.

Each N-by-1 switch module comprises an N-to-1 multiplexer 30 and a control module 32. Multiplexer 30 has N input buses, one from each of the N subbusses on crossbar bus 16. Control module 32 operates multiplexer 30 to select, for connection to sink 24, one subbus from crossbar bus 16. As will be hereafter understood, control module 32 samples two lines from each subbus within crossbar bus 16 and derives its main control functions from signal levels applied to those two lines. It is to be noted that the subbusses within crossbar bus 16 carry not only crossbar configuration data, but all other data between sources and sinks.

When a source wishes to transmit data to one sink or a set of sinks, it first establishes a connection to the sink(s). After the connection is established, the source transmits an M-bit data word every clock cycle. The crossbar switch broadcasts the M-bit data word to every sink that is connected to the source.

Figure 3:
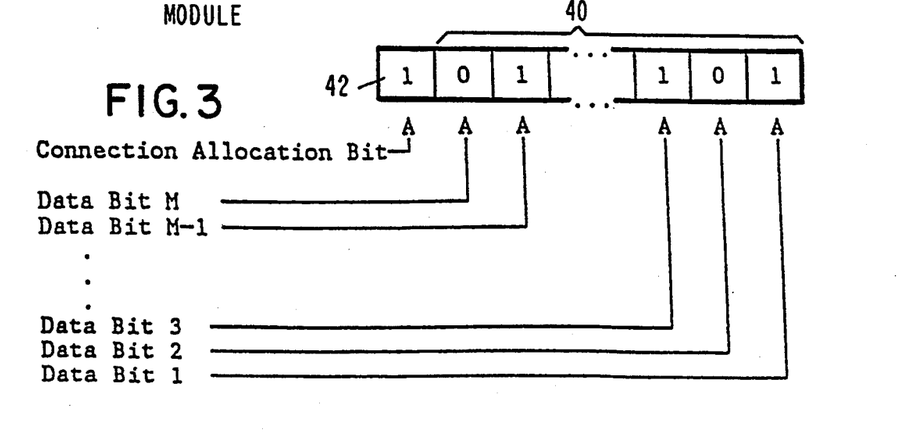
FIG. 3 is a schematic that illustrates bit position allocations in a connection mask used by the invention.

To establish a connection to a sink or set of sinks, a source performs a "Connection Allocation Cycle" (CAC). A CAC occupies only one clock cycle and provides connection allocation through the transmission of a special connection mask word to each N-by-1 switch module. An additional "Connection Allocation Bit" (CA) is appended to the connection mask word to denote a CAC. In FIG. 3, an N bit connection mask word is shown comprising N individual data bits 40. CA bit 42 is appended at the end of the mask word and, when asserted, indicates that mask word 40 is, in effect, a connection mask, each of whose bit positions maps to a specifically assigned sink. For example, if a source wishes to allocate sinks, 2, 4, and 8, it issues a CAC with the CA bit asserted and sets to the one level, data bits in the second, fourth and eighth bit positions within word 40.

If a word impressed on crossbar bus 16 does not have the CA bit asserted, it is treated as a standard data word destined for a sink or set of sinks in dependence upon preexisting connections. As will be understood, the connection allocation mechanism used in this crossbar switch requires no special control signals outside of the CA bit. Likewise, each N-by-1 switch module operates independently of all other switch modules, and no intercommunication is required.

Each control module 32 in an N-by-1 switch module (e.g. 18) monitors the state of two lines in every subbus within crossbar bus 16. Thus, a control module 32 will monitor the state of (a) the line carrying the CA bit in every subbus on crossbar bus 16 and (b) the line on which a connecting mask manifests a bit that maps to the respective data sink. Since control module 32 is associated with sink 1, it will monitor, in every subbus, the state of the line carrying bit position 1, as well as the line carrying the CA bit.

CROSSBAR BUS LINE ASSIGNMENTS

Figure 4:
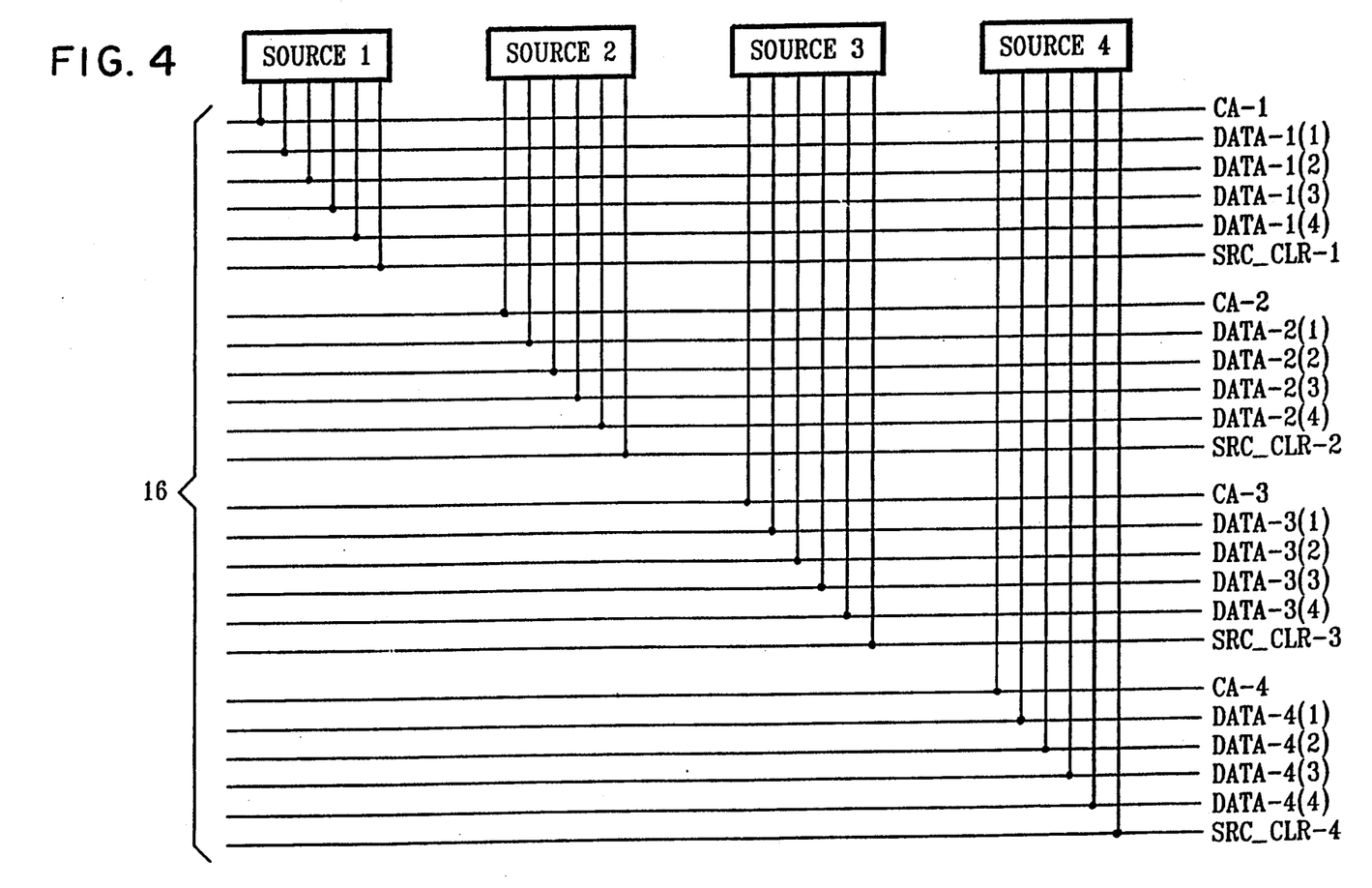
FIG. 4 illustrates a block diagram of a crossbar input bus used by the invention, with a 4×4 crossbar switch.

FIG. 4 illustrates the line assignments present on crossbar bus 16 in a 4×4 crossbar switch. Although 4 bit data subbusses are illustrated, the data bus may have any number of bits.

Each source "p" presents five data signals and a clear signal to the crossbar switch. These are:

CA-p is the connection allocation bit from Source p.
During a Connection Allocation Cycle, the CA-p bit is asserted (along with some number of data bits) to indicate to the crossbar switch that the source is attempting to allocate a set of sinks.
During a data transmission cycle, the CA-p bit is clear.
DATA-p(1) is data bit 1 from Source p.
During a Connection Allocation Cycle, the DATA-p(1) bit is asserted (along with the CA-p bit) to indicate to the crossbar switch that the source is attempting to allocate Sink 1.
During a data transmission cycle, the DATA-p(1) bit is passed through the crossbar switch to the sinks allocated to Source p.
DATA-p(2) is data bit 2 from Source p.
During a Connection Allocation Cycle, the DATA-p(2) bit is asserted (along with the CA-p bit) to indicate to the crossbar switch that the source is attempting to allocate Sink 2.
During a data transmission cycle, the DATA-p(2) bit is passed through the crossbar switch to the sinks allocated to Source p.
DATA-p(3) is data bit 3 from Source p.
During a Connection Allocation Cycle, the DATA-p(3) bit is asserted (along with the CA-p bit) to indicate to the crossbar switch that the source is attempting to allocate Sink 3.
During a data transmission cycle, the DATA-p(3) bit is passed through the crossbar switch to the sinks allocated to Source p.
DATA-p(4) is data bit 4 from Source p.
During a Connection Allocation Cycle, the DATA-p(4) bit is asserted (along with the CA-p bit) to indicate to the crossbar switch that the source is attempting to allocate Sink 4.
During a data transmission cycle, the DATA-p(4) bit is passed through the crossbar switch to the sinks allocated to Source p.
SRC_CLR-p is the connection clear signal from Source p.
When Source p wishes to drop its connection to a set of sinks, it asserts the SRC_C-LR-p signal for one clock cycle. At this time, any sinks connected to Source p will drop their connection.

Since each source presents six signals to crossbar bus 16, the total width of the bus is 24 signals. When implementing this crossbar switch architecture, time division multiplexing can be used to reduce the width of the physical bus that must be passed between modules (see discussion with respect to FIG. 15).

Figure 5:
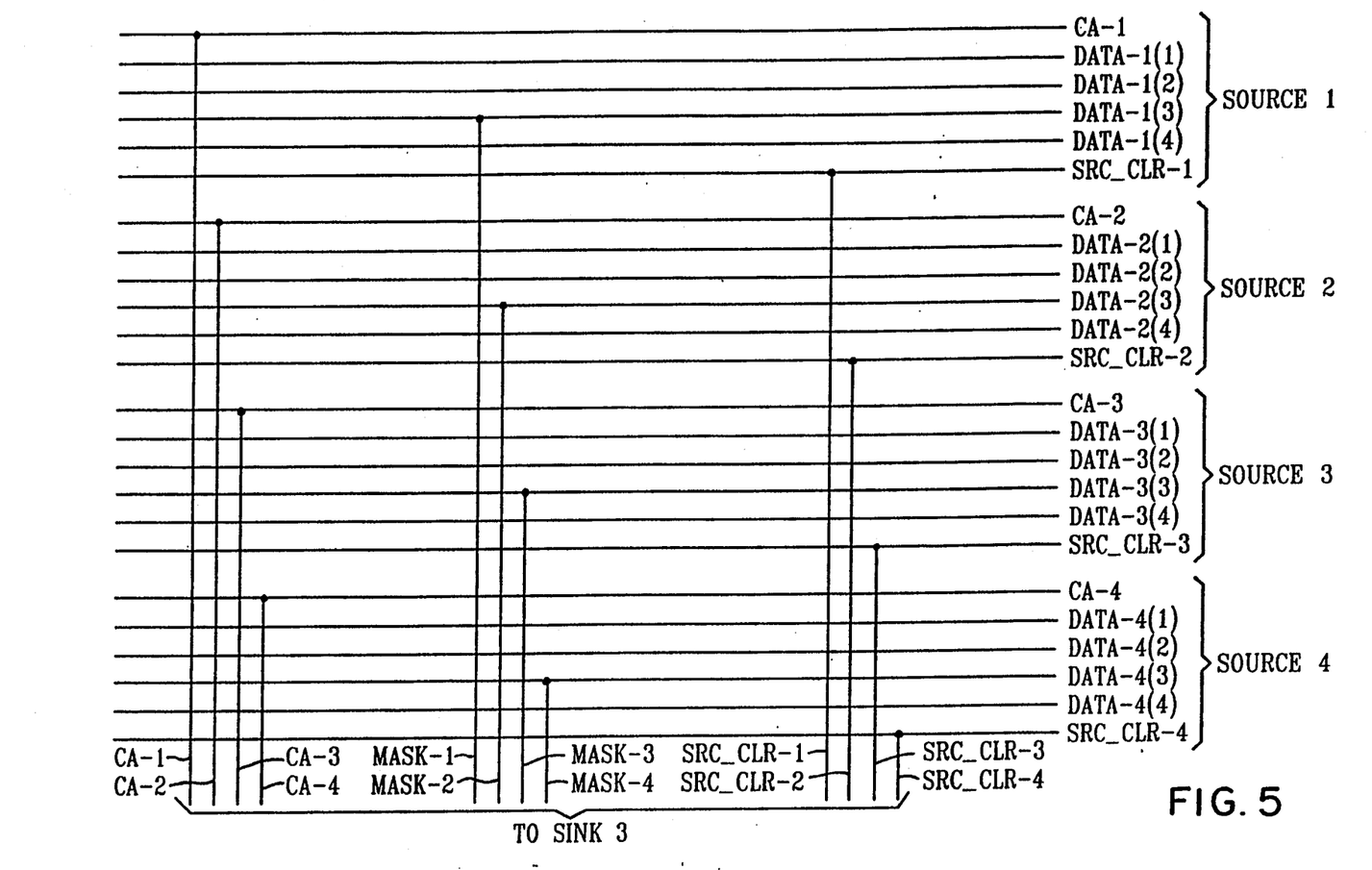
FIG. 5 is a schematic of the crossbar input bus showing signals received by sink 3.

Referring to FIG. 5, the signals presented on crossbar bus 16 are used by an N by 1 switch module as follows. The signals CA-1, CA-2, CA-3 and CA-4 are used to derive arbitration bits in each module.

In the embodiment shown in FIGS. 2 and 6–10, when a source performs a connection allocation cycle, it asserts its CA bit. If two or more sources attempt to perform a connection allocation during the same clock cycle, then two or more CA bits are asserted. In this situation, an arbitration mechanism is employed to determine which source is to be allowed to succeed in its connection allocation attempt.

Arbitration is performed by prioritizing the sources. In this example, the sources are sequentially numbered in the order of their priority (e.g. source 4 has the highest priority). Thus, knowing the number of the source directly indicates its priority. Circuitry is provided which enables the highest priority source attempting to allocate a sink to be honored. An ARB bit is generated in response to asserted CA bits and indicates which source won the arbitration. The generation of ARB bits will be described in relation to FIG. 10 below.

As shown in FIG. 5, sink 3 monitors each of the indicated lines from sources 1–4. Thus, sink 3 monitors the levels on the bit 3 positions on each of the subbusses which emanate from sources 1–4. If a bit 3 position is asserted from source i along with CA-1, that signal is interpreted by the N by 1 switch module associated with sink 3 as a signal indicating that source i is attempting to allocate and connect to sink 3. Similar levels appearing on the bit 3 lines (and the CA-2, 3 and 4 lines) for sources 2, 3, and 4 result in similar signals being manifested. Sink 3 also monitors the clear lines to know when a source wishes to terminate a connection.

N to 1 MULTIPLEXER

Figure 6:
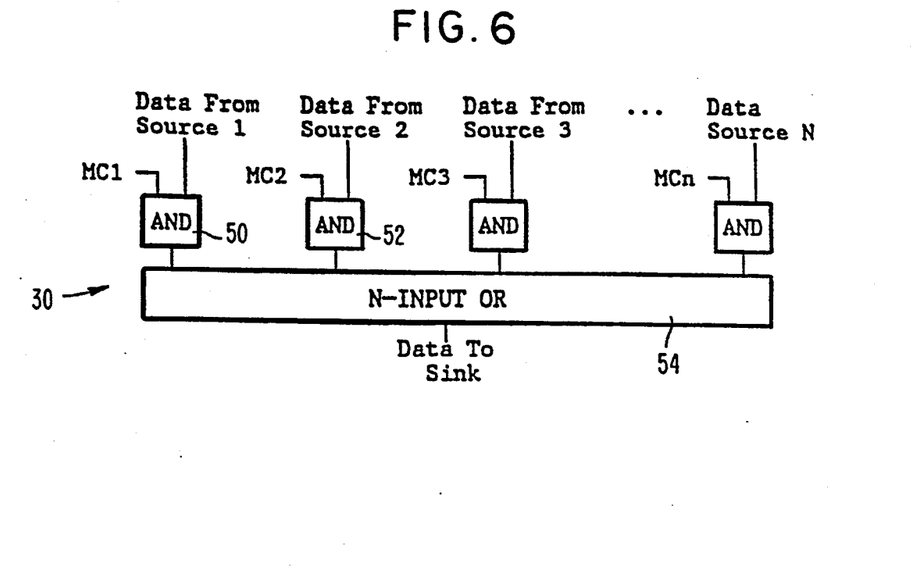
FIG. 6 is a block diagram of an N to 1 multiplexer used with each sink.

FIG. 6 illustrates the circuitry used to implement the N-to-1 multiplexer in each N-by-1 switch module. As will be recalled, the N-to-1 multiplexer is employed to connect a subbus to a particular sink after a Connection Allocation Cycle. During a CAC the associated control module (e.g. 32) generates a Multiplexer Control (MC) bit. Control Module 32 can generate 1 MC bit for each source in the system; however only 1 MC bit is ever asserted. If a sink is to be connected to a source, the MC bit associated with the source will be set. Essentially, MC bits are the decoded version of the CA and connection bit mask inputs to a control module.

As shown in FIG. 6, multiplexer 30 is configured with an OR tree 54. A plurality of AND gates 50, 52 etc., connect thereto. Each AND gate is connected to a subbus within crossbar bus 16 and accesses data words impressed on the subbus. Each AND gate 50 has an MC bit connected as a gating input. Thus, depending upon which MC bit is asserted by the associated control module, one of N AND gates will be enabled, thereby allowing data from the connected subbus to pass into and through the N-input OR gate 54 to the connected sink.

MULTIPLEXER/CONTROL MODULE EXAMPLE

Figure 7:
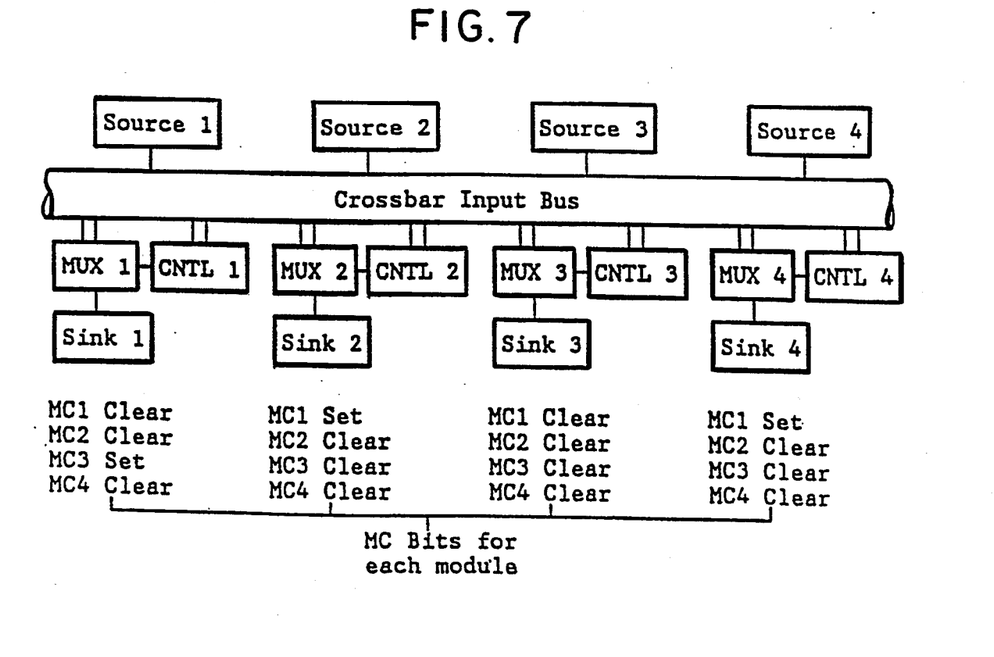
FIG. 7 is a block diagram helpful in explaining the use of multiplexer control (MC) bits.

In FIG. 7, an example is presented to enable a fuller understanding of the operation of a multiplexer/control module. Suppose the following connections exist in a 4 by 4 crossbar switch: Source 1 is connected to sinks 2 and 4 and source 3 is connected to sink 1. In this situation, the MC 1 bit in the control modules associated with sinks 2 and 4 is asserted. This indicates that sink 2 is connected to source 1 and sink 4 is connected to source 1. Furthermore, the MC3 bit in sink 1's control module is asserted indicating that sink 1 is connected to source 3. FIG. 7 illustrates the example by indicating the MC values for each multiplexer, as generated by the associated control module. Note that each control module maintains its own set of MC bits, illustrating the distributed nature of the crossbar control circuitry.

MC SIGNAL GENERATION

Figure 8:
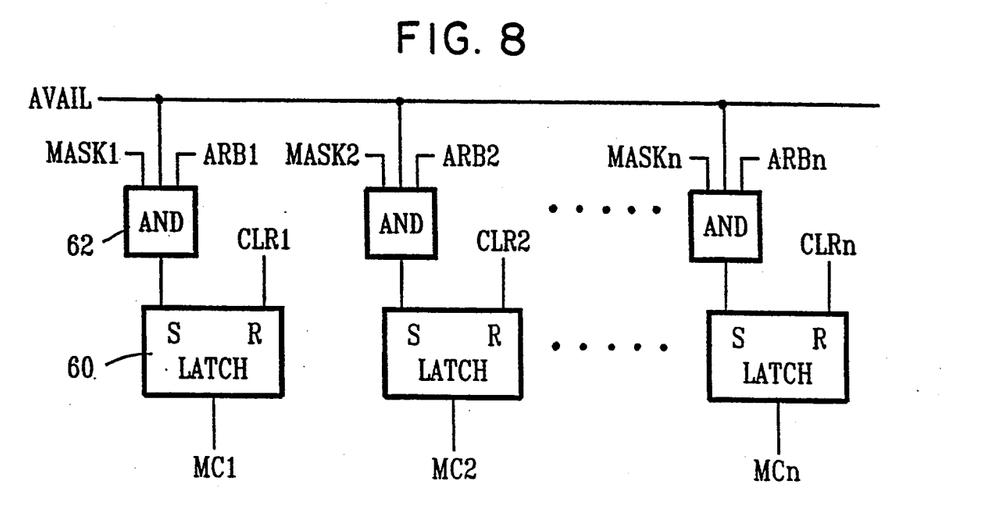
FIG. 8 is a block diagram of sink control circuitry.

As above indicated, each control module maintains its own set of MC bits. The circuitry for generating the MC-bits is shown in FIG. 8 and includes latch circuits 60 for manifesting active state MC bits. Additional signals used within each control module are the MASK j, AVAIL, ARB j and CLR j signals. There are N MASK j signals numbered MASK 1, MASK 2, MASK 3 . . . and MASK N as received from monitored subbus bit lines. Similarly, there are N ARB j signals and N CLR j signals in each module. The signals are not shared or exchanged between modules.

An MC bit is set whenever a source performs a Connection Allocation Cycle and asserts a connection mask bit associated with a sink. Specifically, three conditions must be true for a sink to be allocated. The sink must be available (not already in use), a source must have attempted to allocate the sink, resulting in the setting of its associated MASK bit, and the source attempting to allocate the sink must be the highest priority source attempting to do so, thereby enabling its associated ARB bit to be set. Each of those signals is fed to an AND gate 62 whose active output sets the associated latch 60 to generate an MC bit. As will be understood, only one AND gate 62 provides such an output to a latch 60 in any N by 1 switch module during a Connection Allocation Cycle. As a result, only one MC bit can be generated during a Connection Allocation Cycle.

AVAIL SIGNAL GENERATION

Figure 9:
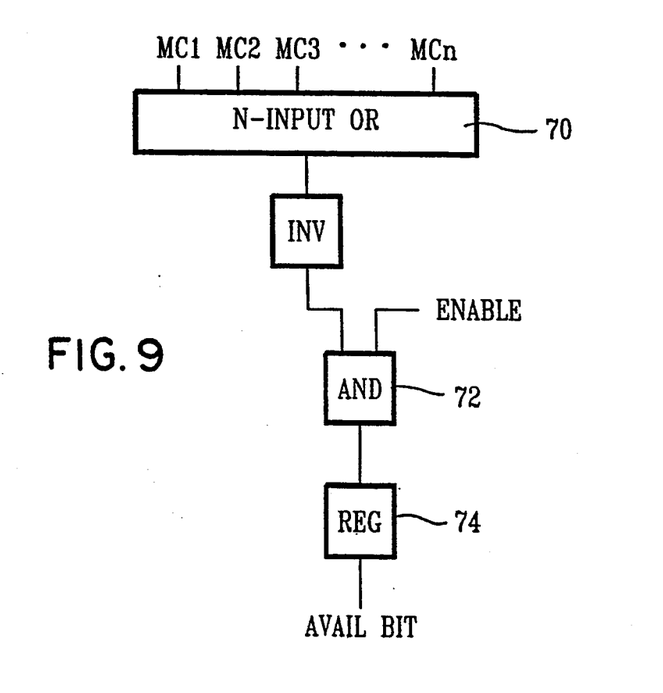
FIG. 9 shows a logic circuit for generating an available bit in a sink control module.

In order to have an MC signal asserted, a sink must be available when the allocation signal occurs. If a sink is available, its AVAIL signal is asserted. If the sink is not currently available, the associated control module ignores the Connection Allocation Cycle and its MC bits remain unchanged. In FIG. 9, a circuit is shown for generating an AVAIL signal. A sink generates an AVAIL signal by examining the current state of all MC bits within its N by 1 switch module. Such bits are applied to an N-input OR circuit 70 whose output is inverted and applied to an AND gate 72. An enable signal is shown as an input to the AVAIL circuit of FIG. 9. That signal is merely a level that either connects or disconnects a sink from the overall network. Thus, upon activation of an enable signal, if any MC bit is set, the inverted output from OR circuit 70 prevents AND gate 72 from setting register 74. If no MC bit is asserted, register 74 is set to manifest an AVAIL bit, indicating that the sink is not connected to any source and is available for allocation.

ARB SIGNAL GENERATION

Finally, in order for an MC bit to be set, the source attempting to allocate the sink must have won right to perform a Connection Allocation In the case where two or more sources perform a Connection Allocation Cycle during a same clock cycle, an arbitration is implemented. In the architecture shown in FIG. 2, arbitration is performed by prioritizing the sources in the system and allowing only the highest priority source to allocate a sink during a Connection Allocation Cycle. The ARB j signal is used to indicate which source j won-the right to allocate a sink during a clock cycle.

Figure 10:
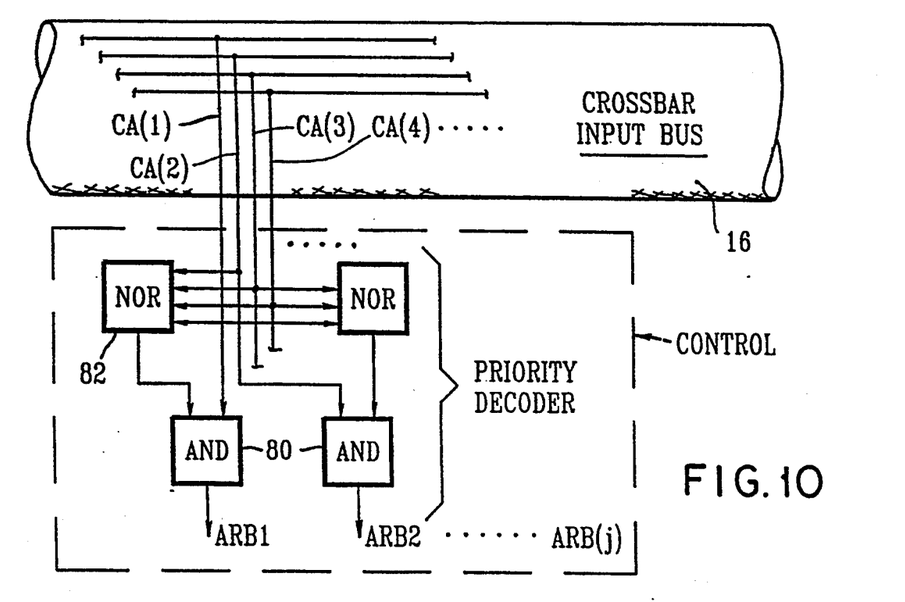
FIG. 10 is a logic circuit for providing arbitration between contending sources for a sink.

In FIG. 10, the logic circuitry needed to generate the ARB j signal is shown in any N-by-1 switch module. Each control module examines each connection allocation CA bit in a Connection Allocation Cycle. Each (CA) bit is applied to one input to an AND gate 80, with all higher order CA bits being applied to a NOR gate 82. Thus, NOR gate 82 has CA bits from sources 2, 3, 4, 5 etc. applied, whereas the CA bit from source 1 is applied to AND gate 80. If any CA input to NOR gate 82 is active, its output falls to the low state and de-enables AND gate 80. Thus, assuming that one or more higher order CA bits is active, the low state from NOR gate 82 prevents AND gate 80 from generating an ARB-1 signal. As a result, only the highest order source is enabled to cause the control module to generate an ARB (j) bit where j corresponds to the highest priority number of the source. Similar logic circuits are used to generate ARB signals from other asserted CA bits.

As a result, it can be seen that three signals, i.e. MASK, AVAIL and ARB are each generated internally in the N-by-1 switch module by examining only data signals available on crossbar bus 16 and the module's internal availability state. No central control source is used to generate control signals.

N-to-1 PIPELINED MULTIPLEXER

Figure 11:
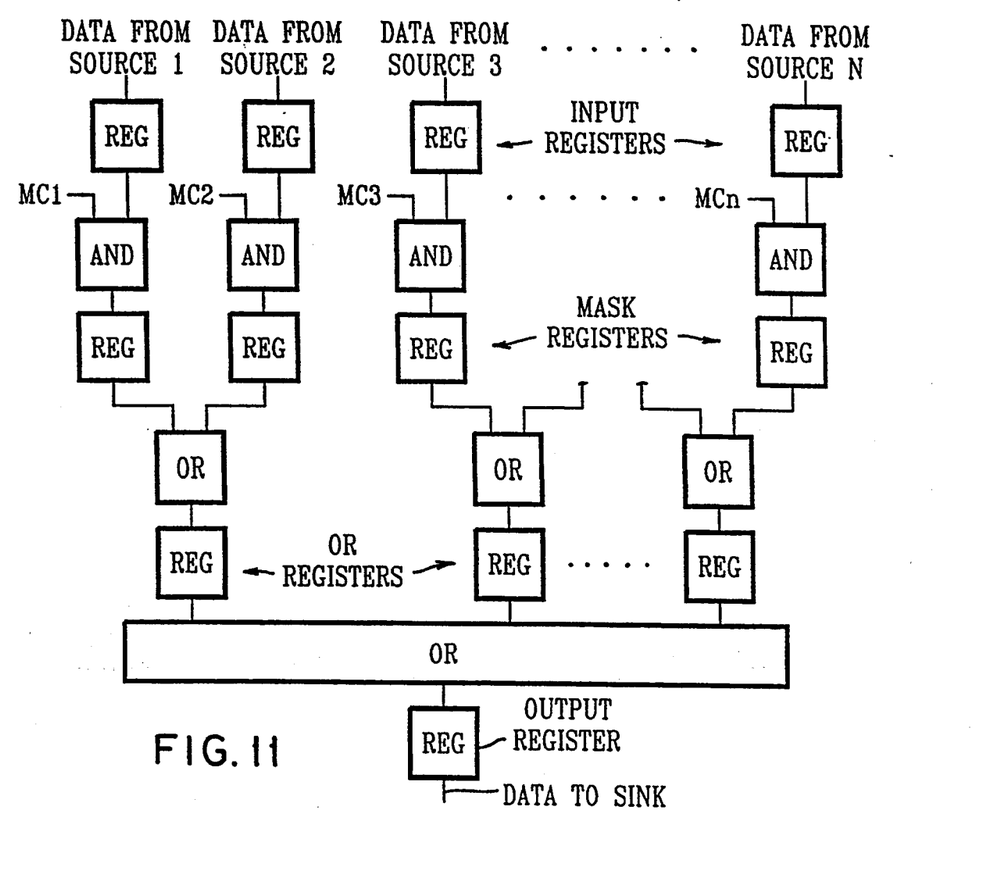
FIG. 11 is a block diagram illustrating an N-to-1 multiplexer implemented by four pipeline stages.

The N-to-1 multiplexer shown in FIG. 6 can be configured in a pipeline manner. FIG. 11 illustrates a block diagram of such a pipeline arrangement and is implemented with four pipeline stages: input registers, mask registers, OR registers and an output register. FIG. 11 operates as follows. Data from each source is presented via crossbar bus 16. Each clock cycle, one word is latched into the input registers. During the next clock cycle, each source's data word is masked against the MC control bits and latched into the mask registers. Since only one MC bit may be asserted at any time (assuming 1-to-many communication), only one source's data word will pass through the masking stage.

The OR implementation shown in FIG. 11 employs a two-part pipeline design. During the first part, the masked data from sources 1 and 2 is combined and latched into the OR registers. Similarly, masked data from sources 3 and 4 is combined and latched into the respective OR registers. This process is applied to every source's data during the second part of the OR tree pipeline. Data from each of the OR registers is combined and then latched by the output register. The data from the output register is then sent to the sink.

Each clock cycle, a new set of data words may be latched into the input registers. Each stage of the pipeline is independent and can be computing on a different set of data during the same clock cycle. For example, the circuitry shown in FIG. 11 has four pipeline stages. Thus, at any given time, the entire circuit has four different sets of data being operated on with one set in each stage. The pipeline allows one data word to be sent to the sink each clock cycle (a data throughput of one word every clock cycle), after passing through four stages in the switch (i.e. a data latency of four clock cycles).

It should be noted that the pipeline stages may be inserted freely (or not at all) in an N-to-1 multiplexer's data path so long as the control circuitry is similarly pipelined to remain synchronized to the multiplexer's operation. To this point in FIG. 11, it has been assumed that a sink is connected to one source. Thus, only one MC bit is set in each module. If the sink is not connected to any source, no MC bits are asserted and no source data passes through the MC bit gating stage and the sink will be sent a data word of all 0 bits.

VALID BIT

While not required, implementations of the crossbar switch architecture of this invention may use a Valid Bit in the data word. When the source wishes to send a Valid Data Word to its set of sinks, it sends a data word with a bit corresponding to the Valid Bit asserted. Sinks can recognize Valid Data Words by examining the state of the Valid Bit. If the sink receives a data word of all 0 bits (the case when it is not connected to any source and no MC bits are asserted), the valid bit in the data word would not be asserted and the sink can treat the data word as invalid.

MC SIGNAL RESET

Returning to FIG. 8, once the MC signals are set by a Connection Allocation Cycle, they can be cleared in one of two ways. First, the sink itself may wish to terminate the connection. Second, the source may wish to terminate the connection. The CLR j signal represents the logical OR of a "Drop Connection Signal" from a sink and a "Drop Connection Signal" from source J. Once the MC bits are cleared, the module's AVAIL signal is reasserted, indicating that the module is available for allocation.

MULTIPLE SINK ALLOCATION

When a source attempts to allocate a set of sinks during a Connection Allocation Cycle, some or all of those sinks may be allocated to other sources. In such case, the source will be connected to all those sinks that are free, ignoring the fact that it did not obtain every sink for which it asks. If a source performs a Connection Allocation Cycle to a set of sinks which are all currently allocated, the source will be connected to no sinks. A time out mechanism or a control mechanism may be used to recognize the case when the source fails to allocate any sinks.

Referring back to FIG. 10, it will be recalled that only one ARB bit can be asserted during any Connection Allocation Cycle. Thus, in any cycle where a Connection Allocation Bit is asserted, only the highest priority source succeeds in having its interconnection made to the respectively addressed sinks. This action assures that, during any clock cycle, no sink can reply to two or more requests for connection. Furthermore, non-addressed sinks are prevented from responding to lower priority sources until a higher priority source has completed its Connection Allocation Cycle. The invention can be modified, however, to handle multiple sink allocations per clock cycle. The goal of the modification is to allow source N to allocate a set of sinks and source M to allocate a different (and possibly overlapping) set of sinks. The higher priority source is connected to every available sink in its set whereas the lower priority source is connected to every available sink in its set. When a sink is requested by more than one source, it is allocated to the higher priority source.

Figure 12:
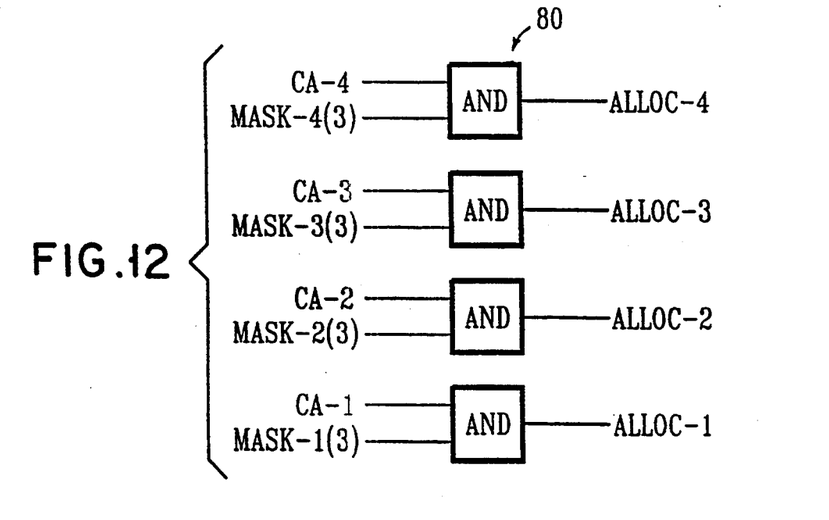
FIG. 12 is a block diagram of logic circuitry for generating allocation signals in a sink, for a second embodiment of the invention.
Figure 13:
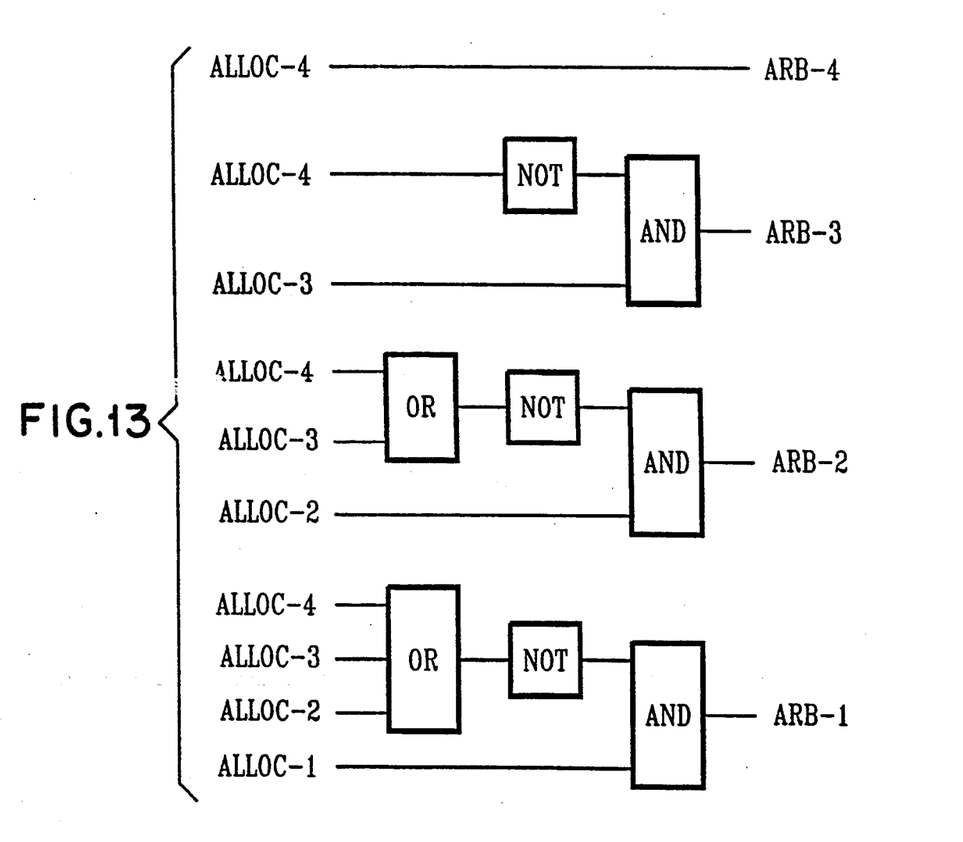
FIG. 13 is a block diagram illustrating how the signals generated in FIG. 12 provide arbitration between contending data sources.
Figure 14:
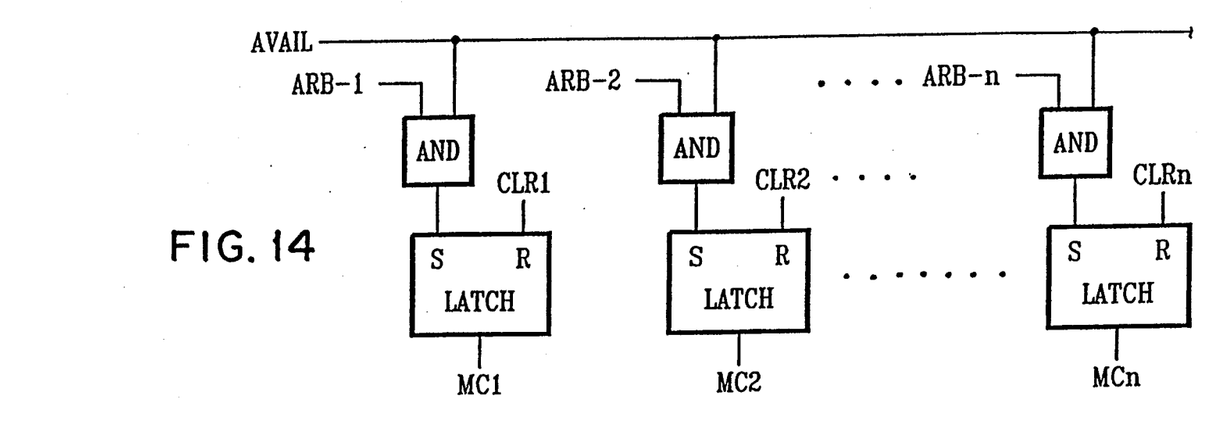
FIG. 14 is a block diagram of sink control circuitry that uses the signals generated by the circuitry of FIG. 13.

Circuitry for enabling the above allocation extension is shown in FIGS. 12, 13 and 14. An additional allocation signal is generated to enable the multiple allocations to occur, and is denoted ALLOC. As shown in FIG. 12, the N-by-1 switch module associated with each sink has a plurality of AND gates 80, each of which has CA and MASK bit levels applied to it from each of the subbusses on crossbar bus 16. Each AND gate thus monitors the CA bit states on the subbusses and mask bits on each subbus which corresponds to the particular sink. For example, if it is assumed that the arbitration circuitry shown in FIGS. 12-14 is associated with data sink 3, then each mask input to AND gates 80 will manifest bit 3 of the connection mask word. Further assuming that there are only four subbusses, the top-most AND gate 80 will receive the connection allocation bit from subbus 4, and mask bit position 3 on subbus 4. Similarly, each of the other AND gates is attached to a corresponding bus with the mask bit connection being to the indicated mask bit line. (This connection is also illustrated in FIG. 5). As a result of the aforesaid connections, AND gates 80 will manifest an allocation signal (ALLOC) which indicates which source connected to a particular subbus is attempting to allocate sink 3.

Turning to FIG. 13, the circuitry is shown for generating an ARB signal in response to an ALLOC signal from AND gates 80. The circuitry is substantially similar to that shown in FIG. 10. It will be recalled, that the circuitry of FIG. 10 only asserts an ARB signal corresponding to the highest priority source attempting a data sink allocation. In the circuitry of FIGS. 12-14, however, a higher priority data source attempting to allocate another data sink (other than sink 3) will not inhibit a data source from allocating data sink 3, so long as no other higher priority data source is also attempting to allocate sink 3. Thus, parallel allocation can occur, with priority states being maintained among data sources. The circuitry shown in FIG. 13 assures that an ARB level will be generated that corresponds to the highest priority data source that is attempting to allocate data sink 3 (in this example). A data source attempting to allocate any other data sink will not affect this operation.

In FIG. 14, modified logic circuitry is shown that responds to the ARB levels generated by the circuitry of FIG. 13. The circuitry of FIG. 14 provides MC signals corresponding to the highest priority data source attempting to allocate the associated data sink. No input is required from the MASK bits as the ARB signals already include the information therefrom and the MC bits can be set by examining only the ARB and AVAIL levels.

MULTIPLEXED CROSSBAR BUS

Figure 15:
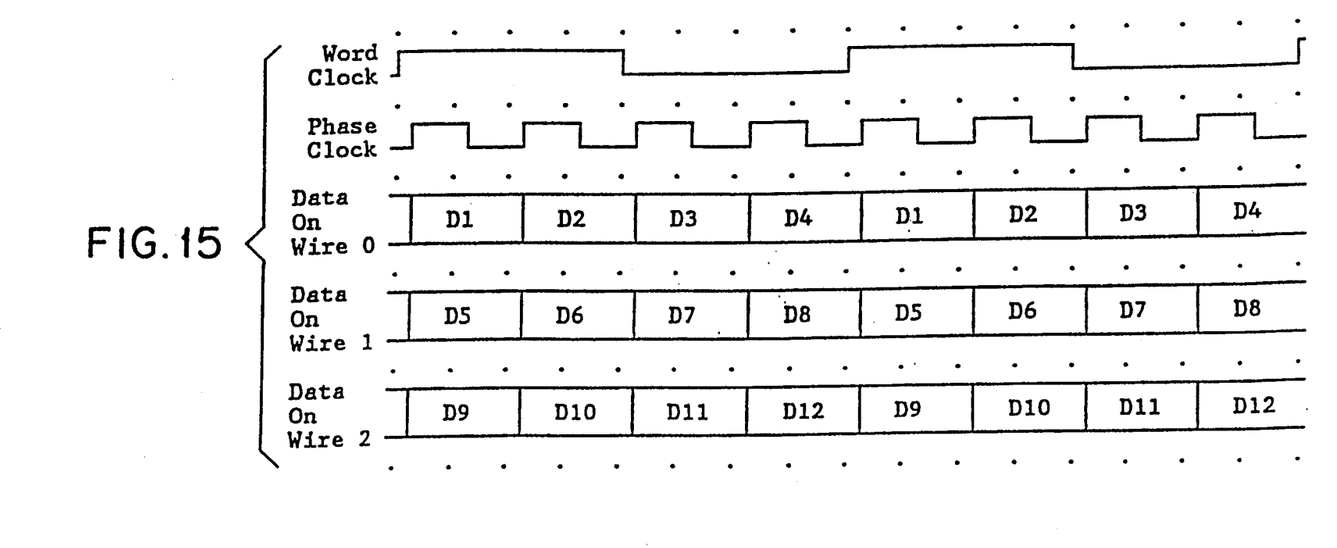
FIG. 15 is a timing diagram showing how each source data bus may be time division multiplexed to enable the use of less-wide bus structures.

Turning to FIG. 15, a timing diagram is shown that allows each subbus on crossbar bus 16 to be configured in a less-wide manner. The primary scalability constraint for the architecture shown in FIG. 2 is the input-/output requirement of the switching module. Every clock cycle, every N-by-1 switch module must examine the data presented on each subbus within crossbar bus 16. Thus, the I/O requirement for a switch module scales linearly with the number of sources in the system.

In order to reduce the I/O requirement of each switch module, time division multiplexing can be used to reduce the physical width of each of the data subbusses. Specifically, each clock cycle (called a word clock), is divided into several phases called phase clocks. During each phase clock, one bit of information is transmitted to a switch module on every physical bus wire. FIG. 15 shows a timing diagram for a 12 bit data bus which has been time division multiplexed into four phases along three physical wires. During each of four phase clocks in a single word clock time, three data bits are emplaced on three physical lines. Over a single clock, 12 bits are provided over the three lines.

The crossbar architecture extends to operate in a time division fashion and does not require that databusses be demultiplexed inside the chip. The pipelined N-to-1 multiplexer described above will handle time division multiplexed data without change. Each register in a pipeline is clocked with the phase clock rather than the word clock. Similarly, the control circuitry in each switch module also handles time division multiplexed data. The only complication is the generation of the ALLOC j signals. Since the ALLOC j signal corresponds to the bit in the connection allocation data word corresponding to source J, the ALLOC j signal must be extracted during one phase of the phase clock each word clock. Similarly, the CA bit must also be extracted during one phase clock of each word clock.

CROSSBAR SWITCH EXAMPLE

The following example will aid in an understanding of the operation of the crossbar switching network shown in FIG. 2. It is assumed that source 1 allocates sinks 2 and 4 and that the crossbar switch is idle and that no source is talking to any sink. Thus, every sink is available for allocation.

Source 1 begins the allocation attempt by placing a connection allocation data word onto crossbar bus 16. Specifically, Source 1 transmits the following data word onto crossbar bus 16:

| | |
|---|---|
| CA-1 | set to 1 to indicate a connection allocation attempt |
| DATA-1(1) | set to 0 since Sink 1 is not in the set of sinks to attempt to allocate |
| DATA-1(2) | set to 1 since Sink 2 is in the set of sinks to attempt to allocate |
| DATA-1(3) | set to 0 since Sink 3 is not in the set of sinks to attempt to allocate |
| DATA-1(4) | set to 1 since Sink 4 is in the set of sinks to attempt to allocate |
| SRC_CLR-L | set to 0 since Source 1 is attempting to allocate a set of sinks. This signal is used when Source 1 wishes to terminate its connection to the sinks. |

Simultaneously, each sink computes ARB bits from the CA bits presented on the crossbar bus 16. Assuming that only Source 1 is performing a connection allocation this clock cycle, only the CA-1 bit will be asserted. Thus, the ARB bits are computed as follows:

| | |
|---|---|
| ARB-1 | set to 1 |
| ARD-2 | set to 0 |
| ARB-3 | set to 0 |
| ARB-4 | set to 0 |

Note that the ARB bits are computed in the same manner in every switch module in the crossbar switch.

In Sink 1, the MASK bits will all be clear. Thus, Sink 1's MC bits will not be changed this clock cycle and the sink will not respond to the connection allocation attempt.

In Sink 2, the MASK-1 bit will be asserted since Source 1 is attempting to allocate Sink 2. Since the ARB-1 bit is set AND the MASK-1 bit is set AND the sink is available, the MC-1 bit in Sink 2 will be set. Thus, Sink 2 will become allocated to Source 1.

In Sink 3, the MASK bits will all be clear. Thus, Sink 3's MC bits will not be changed this clock cycle and the sink will not respond to the connection allocation attempt.

In Sink 4, the MASK-1 bit will be asserted since Source 1 is attempting to allocate Sink 4. Since the ARB-1 bit is set, and the MASK-1 bit is set, AND the sink is available, the MC-1 bit in Sink 4 will be set. Thus, Sink 4 will become allocated to Source 1.

Notice that each of the above steps occurs during the same clock cycle. Thus, the crossbar switch is reconfigured in one clock cycle. Once Source 1 has allocated Sinks 2 and 4, Source 1 can begin to transmit data to the sinks. Source 1 transmits data to the sinks by placing a data word onto crossbar bus 16 each clock cycle. A data word does not have the CA bit set and, therefore, does not cause the crossbar switch to attempt any further allocations.

The connection allocation data word that was first transmitted by Source 1 to allocate the sinks is not passed through the crossbar switch to the sinks. Once a connection is established, the crossbar switch blindly transmits data words from the source to its sinks.

Suppose at this point, Sink 2 decides to drop its connection to Source 1. The following steps occur.

Sink 2 asserts the SINK_CLR signal to tell the module associated with Sink 2 to terminate any connections it currently has to any source.

The control circuitry for Sink 2 performs a logical OR of the SINK_CLR signal with the SRC_CLR signals from crossbar bus 16 to generate the CLR signals. The computed CLR signals in Sink 2's module are:

| CLR-1 | set to 1 |
|---|---|
| CLR-2 | set to 1 |
| CLR-3 | set to 1 |
| CLR-4 | set to 1 |

Since the CLR-1 signal is asserted, the MC-1 bit in Sink 2's module will be reset to zero.

Once the MC-1 bit in Sink 2's control circuitry is reset to zero, the sink will become available again for future allocation attempts. As with the connection allocation operation, the drop connection operation also takes only one clock cycle to complete.

Notice that the connection between Source 1 and Sink 4 is undisturbed. Source 1 can still be transmitting information to Sink 4 during the clock cycle that Sink 2 drops its connection. Furthermore, if Sink 2 becomes allocated to another source, the connection between Source 1 and Sink 4 will remain undisturbed.

Now suppose that Source 1 has finished transmitting its data to its sinks and wishes to drop its connection to the sinks. The following steps occur:

Source 1 asserts the SRC CLR-1 signal onto crossbar bus 16. This signal causes any sink connected to Source 1 to drop its connection.

In the control circuitry dedicated to Sink 4, the SRC_CLR-1 signal is logically ORed with the SINK_CLR signal to compute the CLR signals. The computed CLR signals in Sink 4's control circuitry are:

| CLR-1 | set to 1 |
|---|---|
| CLR-2 | set to 0 |
| CLR-3 | set to 0 |
| CLR-4 | set to 0 |

Since the CLR-1 signal is asserted, the MC-1 bit in Sink 4's module will be reset to zero.

At this point, the connection between Source 1 and Sink 4 has been dropped. Source 1 is free to allocate other sinks and Sink 4 is free to respond to allocation attempts from other sources. At any time in the above process, other sources and sinks are free to perform allocation and deallocation requests. The crossbar switch is able to service requests without interrupting the connections that have already been established.

It should be understood that the foregoing description is only illustrative of the invention. While the above invention has been described in the context of a crossbar switch, it is to be understood by those skilled in the art that it will operate equally well with a crosspoint switch network. Additionally, the number of sinks may either be equal to or not equal to the number of sources. Various alternatives and modifications can be devised by those skilled in the art without departing from the invention. Accordingly, the present invention is intended to embrace all such alternatives, modifications and variances which fall within the scope of the appended claims.

We claim:

1. A distributed crossbar switching array for substantially simultaneously connecting data sources to one or more of a plurality of data sinks available for connection, said distributed crossbar switching array comprising:

a source data bus connected to each said data source, for transmitting from a connected data source, data words, a connection mask and a connection signal, said connection mask having plural bit positions that map to plural data sinks, a said connection mask and connection signal transmitted in parallel and concurrently; and a multiplexer/control means associated with and connected to each data sink and to each source data bus, for providing connection of an associated data sink to a connected source data bus, each said multiplexer/control means simultaneously monitoring each said connected source data bus and responsive to manifestations on a connected source data bus of a connection signal and a connection mask bit position that is in an active state and maps to the data sink associated with said multiplexer/control means, to create a circuit connection between said associated data sink and said connected source data bus.

2. The switching array of claim 1, wherein each said multiplexer/control means comprises;

multiplexer means for providing connection between each said source data bus and a data sink connected to said multiplexer/control means; and logic means connected to each said source data bus, for issuing an interconnect signal to said multiplexer means to make connection between a said associated data sink and a data source via a source data bus, said interconnect signal issued in response to a manifestation on a said source data bus of a connection signal and a connection mask having an active state bit position that maps to said associated data sink, said interconnect signal issued when said logic means receives an available signal from said associated data sink.

3. The switching array of claim 2, wherein each said source data bus has an assigned priority value, and a said logic means issues said interconnect signal to a said multiplexer means only when no higher priority source data bus manifests a connection signal.

4. The switching array of claim 3, wherein said data sources impress data words on connected source data busses once per clock cycle, a data source also impressing on a connected source data bus, a connection mask and a connection signal simultaneously during a clock cycle whereby a said logic means in response thereto, is enabled to issue said interconnect signal during said clock cycle.

5. The switching array of claim 4, wherein said connection mask is an N-bit data word, where N equals the number of data sinks, and said connection signal is manifested by a bit state appended to said N-bit data word.

6. The switching array of claim 5, wherein each said logic means includes ARB bit logic, said ARB bit logic enabling a determination to be made of the highest priority data source which, in any clock cycle, manifests a connection signal on a source data bus connected thereto, each said source data bus exhibiting the priority of its connected data source, said ARB bit logic comprising:

AND means coupled to a line in each source data bus that manifests said connection signal, for generating an ARB signal for one said source data bus; and inhibitory logic means coupled to lines in all higher priority source data busses that manifest connection signals, for inhibiting said AND means from generating an ARB signal for a connected source data bus if any higher priority source data bus manifests a connection signal.

7. The switching array of claim 6 wherein said multiplexer means is a multiplexer having M sets of inputs, where M equals the number of source data busses, one set of inputs from each said source data bus comprising at least N+1 lines, each said logic means comprising:
- N latches, one each for generating an interconnection signal corresponding to a different source data bus; and
- N AND gates, one each feeding a Set input to an associated one of said latches, each AND gate having at least three inputs, one for receiving an Available state signal from the logic means associated with said data sink, a second for receiving the signal state of a Connection mask bit on a source data bus and a third for receiving an ARB signal from said AND means.

8. The switching array of claim 1 wherein each said source data bus includes at least N+1 conductors, wherein N is the number of data sinks.

9. The switching array of claim 1, wherein each said source data bus includes a subset of N+1 conductors, where N is the number of data sinks, each said data source including time division multiplex means for impressing on said subset of conductors, data words and a connection mask, said multiplex means multiplexing subsets of N+1 bits of a said word or mask a number of times until all N+1 bits have been placed on a source data bus.

10. The switching array of claim 1, wherein each said data source transmits on a connected source data bus a connection clear signal, said connection clear signal transmitted in parallel and concurrently with a said connection mask, each said multiplexer/control means responsive to manifestations on a coupled source data bus of a connection clear signal and a said connection mask bit position that is in an active state and maps to the data sink associated with said multiplexer/control means, to disconnect said associated data sink from said connected source data bus.

11. The switching array of claim 3, wherein each said logic means includes ARB bit logic, each said ARB bit logic enabling a determination to be made of the highest priority source which, in any clock cycle, causes a said connection signal to be manifest in combination with an asserted connection mask bit that maps to a sink associated with said ARB bit logic, said ARB bit logic comprising:
- AND means coupled to lines in each source data bus that manifest said connection signal and said asserted mask bit that maps to the associated sink, for generating an ALLOC signal indicating an attempted allocation of said associated sink; and
- inhibitory logic means coupled to lines in all higher priority source data busses that manifest said connection signals and a mask bit that maps to said associated sink, for inhibiting said ALLOC signal if any higher priority data bus manifests an attempt to allocate said associated sink.

12. The switching array of claim 11, wherein said data sources are adapted impress data words on connected source data busses once per clock cycle, a data source impressing a said connection mask and a connection signal simultaneously during a clock cycle on a connected source data bus, whereby a said logic means in response thereto, is enabled to issue said interconnect signal during said clock cycle.

13. The switching array of claim 12, wherein said multiplex means is pipelined and comprises:
- an input register connected to each source data bus, there being N such input registers, where N equals the number of source data busses;
- gating means for gating an input register in response to an interconnect signal from said logic means, said interconnect signal corresponding to the source data bus connected to said gated input register;
- OR register means for combining outputs from said gating means into an output register, said output register receiving only data gated through said gating means by said interconnect signal; and
- means for sequentially operating said input register gating means and OR register means to create a pipeline data flow.

* * * * *